US009812105B2

(12) United States Patent
Vorobyev (10) Patent No.: US 9,812,105 B2
(45) Date of Patent: Nov. 7, 2017

(54) APPARATUS, METHOD, AND COMPUTER-READABLE STORAGE MEDIUM FOR COMPENSATING FOR LATENCY IN MUSICAL COLLABORATION

(71) Applicant: MIXED IN KEY LLC, Miami, FL (US)

(72) Inventor: Yakov Vorobyev, Rockville, MD (US)

(73) Assignee: MIXED IN KEY LLC, Miami, FL (US)

( * ) Notice: Subject to any disclaimer, the term of this patent is extended or adjusted under 35 U.S.C. 154(b) by 0 days.

(21) Appl. No.: 15/261,640

(22) Filed: Sep. 9, 2016

(65) Prior Publication Data
US 2017/0287457 A1    Oct. 5, 2017

Related U.S. Application Data

(60) Provisional application No. 62/314,689, filed on Mar. 29, 2016.

(51) Int. Cl.
*G10H 7/00* (2006.01)
*G10H 1/00* (2006.01)
*H04L 12/26* (2006.01)
*G10H 1/40* (2006.01)

(52) U.S. Cl.
CPC ............ *G10H 1/0033* (2013.01); *G10H 1/40* (2013.01); *H04L 43/0852* (2013.01); *G10H 2210/375* (2013.01); *G10H 2240/175* (2013.01)

(58) Field of Classification Search
CPC .. G10H 1/0033; G10H 1/40; G10H 2210/375; H04L 43/0852
USPC .......................................................... 84/612
See application file for complete search history.

(56) References Cited

U.S. PATENT DOCUMENTS

| 6,309,301 | B1* | 10/2001 | Sano ..................... A63F 13/12 434/307 R |
| 2014/0005812 | A1* | 1/2014 | Gu ........................ G06Q 30/02 700/94 |
| 2014/0323036 | A1* | 10/2014 | Daley .................... H04H 20/08 455/3.06 |
| 2015/0033932 | A1* | 2/2015 | Balassanian ...... G06F 17/30778 84/609 |

* cited by examiner

*Primary Examiner* — Jianchun Qin
(74) *Attorney, Agent, or Firm* — Oblon, McClelland, Maier & Neustadt, L.L.P.

(57) ABSTRACT

An apparatus, method, and computer-readable storage medium that compensate for latency in a musical collaboration. The method includes setting a tempo for a first client device to follow, receiving a musical piece from the first client device, transmitting the musical piece to a second client device, and instructing the second client device, via an instruction transmitted along with the musical piece, to delay playback of the musical piece a predetermined amount of time to compensate for latency in the musical collaboration, the predetermined amount of time being associated with a measure or a fraction of a measure.

16 Claims, 4 Drawing Sheets

APPARATUS, METHOD, AND COMPUTER-READABLE STORAGE MEDIUM FOR COMPENSATING FOR LATENCY IN MUSICAL COLLABORATION

CROSS REFERENCE TO RELATED APPLICATION(S)

The present application is based on and claims the benefit from U.S. Provisional Application No. 62/314,689, filed Mar. 29, 2016, the entire content of which is hereby incorporated by reference.

BACKGROUND

Field

Embodiments described herein relate to the field of musical collaborations.

Background

Latency is the biggest issue in accomplishing the goal of a virtual "jam session" or a virtual "drum circle" among multiple devices. Latency may occur due to a delay in data reaching a second device from a first device. For example, if the first device is located in one part of the world and the second device is located in another part of the world, there may be a higher delay in communication than if the two devices are in the same city or the same room.

In the musical field, timing is very important as a slight delay may result in a musical composition that is off-key or musically incorrect. For example, a slight delay of a guitar rift generated at a first device on a drum loop generated at a second device may lead to a musical composition that sounds "off."

Accordingly, in order to facilitate a virtual "jam session" or a virtual "drum circle" among multiple devices (located at any geographical location), there is a need for a technology that compensates or accounts for the latency introduced during communication. The present application solves this issue and allows participants to play with zero latency to thereby allow the generation of a sound musical composition (i.e., so everyone can play on the same beat).

BRIEF DESCRIPTION OF THE DRAWINGS

The disclosure will be better understood from reading the description which follows and from examining the accompanying figures. These figures are provided solely as non-limiting examples of the embodiments. In the drawings.

DETAILED DESCRIPTION

One embodiment of the present disclosure is drawn to an apparatus that compensates for latency in a musical collaboration. The apparatus comprises processing circuitry configured to set a tempo for a first client device to follow, receive a musical piece from the first client device, transmit the musical piece to a second client device, and instruct the second client device, via an instruction transmitted along with the musical piece, to delay playback of the musical piece a predetermined amount of time to compensate for latency in the musical collaboration, the predetermined amount of time being associated with a measure or a fraction of a measure.

In one embodiment, the processing circuitry is further configured to calculate the predetermined amount of time to delay playback of the musical piece based on the set tempo.

In one embodiment, the processing circuitry is further configured to set the tempo as well as a key and a scale for the first client device to follow.

In one embodiment, the processing circuitry is further configured to indicate to the first client device, the second client device, and a third client device that the musical collaboration has started, transmit the musical piece received from the first client device to the third client device, and instruct the third client device, via an instruction transmitted along with the musical piece, to delay playback of the musical piece a predetermined amount of time to compensate for latency in the musical collaboration, the predetermined amount of time being associated with a measure or a fraction of a measure.

In one embodiment, the predetermined amount of time is associated with $1/16$ of a measure, $1/8$ of a measure, $1/2$ of a measure, $3/4$ of a measure, 1 measure, 2 measures, or 4 measures.

In one embodiment, the processing circuitry is further configured to, before transmitting the musical piece to the second client device, process the musical piece received from the first client device to correspond to the set tempo.

One embodiment of the present disclosure is drawn to a method that compensates for latency in a musical collaboration. The method comprises setting a tempo for a first client device to follow; receiving a musical piece from the first client device; transmitting the musical piece to second client device; and instructing the second client device, via an instruction transmitted along with the musical piece, to delay playback of the musical piece a predetermined amount of time to compensate for latency in the musical collaboration, the predetermined amount of time being associated with a measure or a fraction of a measure.

In one embodiment, the method further comprises calculating the predetermined amount of time to delay playback of the musical piece based on the set tempo.

In one embodiment, the method further comprises setting the tempo as well as a key and a scale for the first client device to follow.

In one embodiment, the method further comprises indicating to the first client device, the second client device, and a third client device that the musical collaboration has started; transmitting the musical piece received from the first client device to the third client device; and instructing the third client device, via an instruction transmitted along with the musical piece, to delay playback of the musical piece a predetermined amount of time to compensate for latency in the musical collaboration, the predetermined amount of time being associated with a measure or a fraction of a measure.

In one embodiment, the predetermined amount of time is associated with $1/16$ of a measure, $1/8$ of a measure, $1/2$ of a measure, $3/4$ of a measure, 1 measure, 2 measures, or 4 measures.

In one embodiment, the method further comprises processing, before transmitting the musical piece to the second client device, the musical piece received from the first client device to correspond to the set tempo.

One embodiment of the present disclosure is drawn to a method that comprises setting a musical parameter for a device; receiving a musical piece from the device; transmitting the musical piece to another device; and instructing the another device, via an instruction transmitted along with the musical piece, to delay playback of the musical piece a predetermined amount of time, the predetermined amount of time being associated with a measure or a fraction of a measure.

One embodiment of the present disclosure is drawn to a non-transitory computer-readable storage medium including computer executable instructions, wherein the instructions, when executed by a computer, cause the computer to perform a method that compensates for latency in a musical collaboration, the method comprising: setting a tempo for a first client device to follow; receiving a musical piece from the first client device; transmitting the musical piece to a second client device; and instructing the second client device, via an instruction transmitted along with the musical piece, to delay playback of the musical piece a predetermined amount of time to compensate for latency in the musical collaboration, the predetermined amount of time being associated with a measure or a fraction of a measure.

In one embodiment, the non-transitory computer-readable storage medium further comprises calculating the predetermined amount of time to delay playback of the musical piece based on the set tempo.

In one embodiment, the non-transitory computer-readable storage medium further comprises setting the tempo as well as a key and a scale for the first client device to follow.

In one embodiment, the non-transitory computer-readable storage medium further comprises indicating to the first client device, the second client device, and a third client device that the musical collaboration has started; transmitting the musical piece received from the first client device to the third client device; and instructing the third client device, via an instruction transmitted along with the musical piece, to delay playback of the musical piece a predetermined amount of time to compensate for latency in the musical collaboration, the predetermined amount of time being associated with a measure or a fraction of a measure.

In one embodiment, the predetermined amount of time is associated with 1/16 of a measure, 1/8 of a measure, 1/2 of a measure, 3/4 of a measure, 1 measure, 2 measures, or 4 measures.

In one embodiment, the non-transitory computer-readable storage medium further comprises processing, before transmitting the musical piece to the second client device, the musical piece received from the first client device to correspond to the set tempo.

To briefly summarize, the present application is drawn to creating a virtual "drum circle" that participants (for example, anyone from amateurs to professional musicians) from all over the world can join and collaborate along over a network (for example, the Internet). Embodiments of the present application may be drawn to a musical collaboration and/or a video game. In one embodiment, participants may produce musical pieces and compete against each other to acquire as many possible points in an effort to "win," In one embodiment, participants may produce musical pieces and collaborate with others (i.e., participate in a "jam session"). Participants may rate each other based on "applause." In other words, if participants like a particular musical piece produced by participant A, the participants will offer "applause" by pressing a button on a graphical user interface. The more "applause" one receives, the more points this participant acquires.

As noted above, latency is the biggest issue in accomplishing the goal of a virtual "jam session" or a virtual "drum circle." The present application solves this issue and allows musicians to play with zero latency so everyone is playing on the same beat. The present application describes a way to eliminate latency by having an apparatus (for example, a server) quantize to a grid ahead of time and allow a musical piece to be uploaded from each musician. Latency is eliminated because a musical piece uploaded by a musician is not instantaneously shared with the other musicians.

The uploaded pieces (which may be loops) are mixed together by the apparatus to create a musical collaboration (or performance) that is both spontaneous and musically-valid, with zero latency between different loops. The results are synchronized back to the musicians, so they can hear what the other musicians are doing in near-real-time (for example, 8 beats, 4 beats, or less of total delay from the time the musician has uploaded the musical piece).

Thus, the musical piece is analyzed, any necessary corrections are performed, and then the corrected musical piece is transmitted (either at separate times or simultaneously (multicasting)) to all participants in the musical session/collaboration with instructions of the particular measure on which the piece is to be played.

For example, assume a drum loop is comprised of four measures. This drum loop plays continuously. As this loop plays, a participant in the musical session starts composing a musical piece starting on the first measure, and then uploads the musical piece to the apparatus. After the apparatus analyzes and corrects the musical piece and is ready to transmit it to all the participants in the musical session, the drum loop (which has been playing continuously) may be on the second measure or third measure. As such, the apparatus has to wait (i.e., further delay the playback of the musical piece, or instruct another device to further delay the playback) in order to start it correctly on the first measure of the drum loop. Thus, depending on what measure (or part of a measure) is currently being played in the loop, the playback of the musical piece will have to be delayed until the next first measure (or fraction thereof) in the loop starts.

Figure 1:
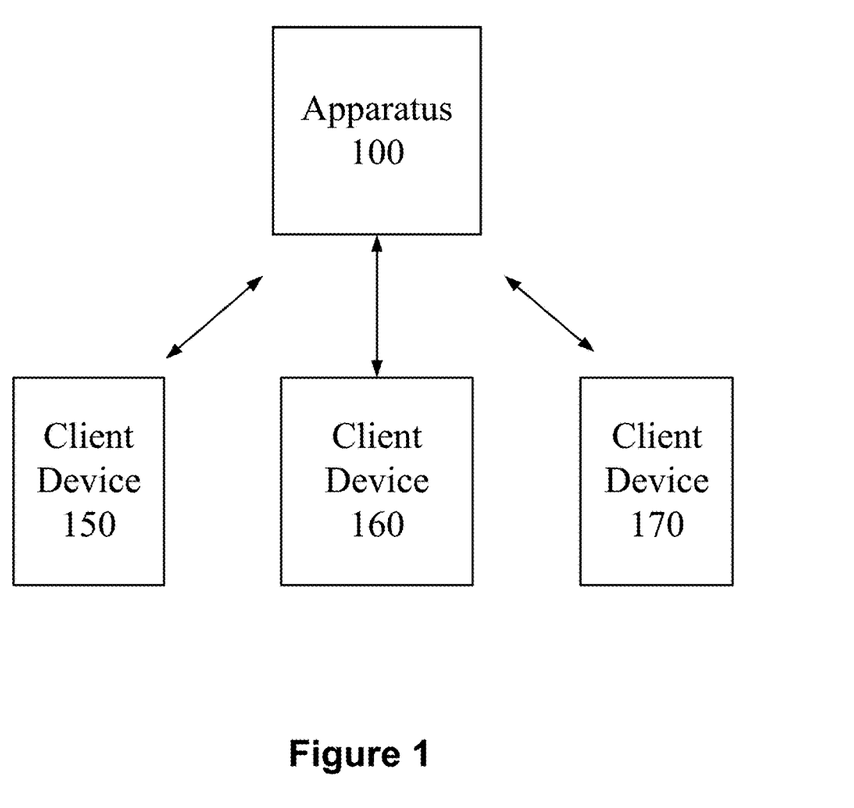
FIG. 1 illustrates an apparatus and various client devices according to one embodiment.

FIG. 1 shows an apparatus 100 and various client devices (or client terminals) 150-170. Note that, unless a distinction needs to be made, client device(s) 150 or client devices 150-170 may be used interchangeably to denote any or all of the devices. It is to be understood that there may be a plurality of each of these aforementioned components. Each of the client devices 150-170 may communicate with apparatus 100 via one or more networks (for example, a local area network (LAN) and/or another communications network, such as the Internet).

Note that, in one embodiment, the apparatus 100 may be part of one or more of the client devices 150-170. In other words, functions of the apparatus 100 may be performed by one or more of the client devices 150-170. Further, in one embodiment, the apparatus 100 may be used to synchronize data between the various client devices.

Note that, in one embodiment, the client devices 150-170 may be in different cities, states, or countries. Thus, in one embodiment, the client devices 150-170 may all be on different networks, and it is not necessary for any client device to be on the same network as any other client device.

In one embodiment, client devices 150-170 are not located in the same room and/or on the same network. In other words, the client devices 150-170 are not on, for example, the same WiFi network. In one embodiment, the client devices 150-170 may only communicate with each other via the apparatus 100. In one embodiment, the client devices 150-170 may communicate with apparatus 100 via a public network (such as, but not limited to, the Internet).

In one embodiment, the client devices 150-170 may be in the same room. In one embodiment, the client devices 150-170 may also communicate with each other.

Apparatus 100 may be a server, computer (personal computer (PC), laptop, netbook, etc.), or the like which may operate with Apple's operating system, Microsoft's Windows®, Google's Android®, Linux, or other operating system software. Apparatus 100 may include the configuration shown in FIG. 4.

A client device 150 may be a cell phone or Smartphone. Cell phones or Smartphones operating with Apples' software. Microsoft's software, RIM's Blackberry® software, or Google's Android® software may be used. These are merely examples, and other cell phone/software combinations may be used. The client device 150 may also be a tablet computer device, such as an IPad®. Again, other tablet/software combinations may be used. The client device 150 may also be a personal digital assistant (PDA) or a computer (personal computer (PC), laptop, netbook, etc.). Each client device may also include the configuration shown in FIG. 4.

Figure 2:
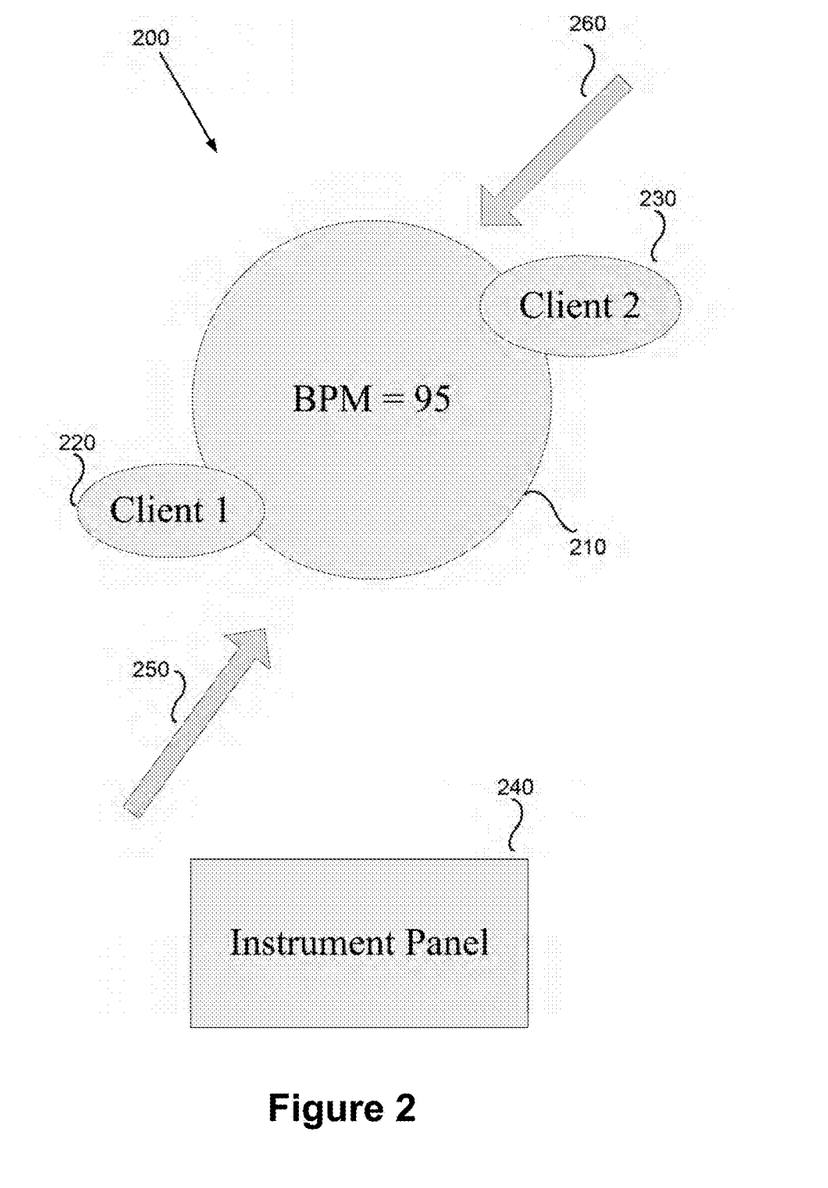
FIG. 2 illustrates a graphical user interface (GUI) displayed at a client device according to one embodiment.

FIG. 2 illustrates a graphical user interface (GUI) 200 displayed at each client device 150 that participates during a musical collaboration/composition. The content that is displayed in GUI 200 is controlled by the apparatus 100. Note that GUI 200 is displayed on a display of the client device 150 when an application (i.e., an "app") is launched on the client device 150. Note that the app may be an application that is downloaded to the client device 150 and installed thereon. In one embodiment, the GUI 200 may be accessed via a web browser and, as such, no app would have to be installed on the client device 150.

In FIG. 2, a musical wheel 210 is displayed (in one embodiment, in the middle of the screen). This musical wheel 210 may be used as a graphical representation of the musical composition and may, at the control of the apparatus 100, display various information and instructions to the client devices 150-170. Note that, in one embodiment, the apparatus 100 may display the same information for all client devices 150-170. In one embodiment, the apparatus 100 may display different information on the musical wheel 210 for different client devices, or a combination of the same information and different information. Note that the musical wheel 210 may take any other shape or simply be a graphical bar or text displaying various types of information.

Elements 220 and 230 graphically illustrate the participants of a current session/musical collaboration. As can be seen in the example of FIG. 2, two participants (a participant represented by element 220 at client device 150, and a participant represented by element 230 at client device 160) are engaged in this musical collaboration/session. Note that, in one embodiment, "client 1" and "client 2" of elements 220 and 230, respectively, may each be replaced by the actual name (or some other type of identification) of the user operating the corresponding client device. Thus, each user may see the other user's name displayed in a circular fashion around the musical wheel 210.

Instrument panel 240 is a graphical representation of the musical instrument that is to be used in the musical composition. The instrument panel 240 may take many forms. For example, panel 240 may include various buttons that, when tapped, generate a "kick" or "clap."

In one embodiment, panel 240 may be a piano and thus display piano keys. In one embodiment, panel 240 may be a guitar, drum machine, trumpet, bass, synthesizer, or any other type of instrument or device that produces music (or a combination thereof).

Note that, in one embodiment, every participant/client device 150 participating in the musical collaboration may have the same instrument panel 240, different instrument panels 240, or a combination thereof. Further, in one embodiment, GUI 200 may also display other participants' instrument panels 240. In such embodiment, the instrument panel associated with "client 2" may be displayed adjacent to element 230 to indicate the relationship between that participant and his/her corresponding instrument panel.

Each of the arrows 250 and 260 (which may also include a slider thereon) is associated with a particular user, and is used to upload a musical piece to the musical wheel 210. Thus, arrow 250 may be associated with client device 150, whereas arrow 260 may be associated with client device 160 (represented as "client 2" by element 230). Note that, in one embodiment, only one arrow may be displayed at each of the participants' devices.

A participant may compose a piece of music using the instrument panel 240 and then, may swipe his/her finger from the bottom of the arrow 250 to the top to indicate that the music is to be uploaded to the apparatus 100. Thus, once the participant swipes, the musical piece/composition is sent to the apparatus 100 by the participant's device 150.

Note that the musical piece/composition may be uploaded in many different ways. For example, the participant may use a tap, a click, or play a specific Musical Instrument Digital Interface (MIDI) note to indicate that an upload should take place (for example, the lowest note on a piano keyboard that would be rarely used for actual music composition because it is practically inaudible on most speakers).

In one embodiment, each participant may select the length of a musical piece/composition he or she would like to upload. For example, one participant may select via the GUI 200 to upload a musical piece/composition of a ½ measure, a 1 measure, a 4 measure, etc. Likewise, another participant participating in the same session may select to upload a musical composition of a different length than what someone else might upload.

Thus, in one embodiment, the participant may determine the length of the musical piece and upload that specific length (for example, every 4 measures), which the apparatus 100 in turn multicasts to all clients devices.

In one embodiment, notes may be auto-uploaded from the client devices 150-170 to the apparatus 100. One possibility is that all uploads are happening in real-time (as soon as the notes are played or audio is recorded), and the apparatus 100 determines how to generate a loop from the uploaded notes and multicast to all client devices participating in the musical collaboration. In one embodiment, the client device 150 may automatically send each measure to the apparatus 100 without a need for a specific button to be clicked, for example, on GUI 200. This may be configured at the beginning of the musical collaboration, during the musical collaboration (i.e., via the GUI 200), or preconfigured in a user profile.

Note that, in one embodiment, no other participant in the musical session/collaboration can hear the music composed at each of the other client devices until the music has been uploaded and then output by the apparatus 100. Thus, participant A at client device 150 can only hear his/her musical composition until this composition is uploaded. Once it is uploaded, the apparatus 100 transmits the composition to the other participants, and thus, the other participants are able to hear the musical composition composed by participant A.

Figure 3:
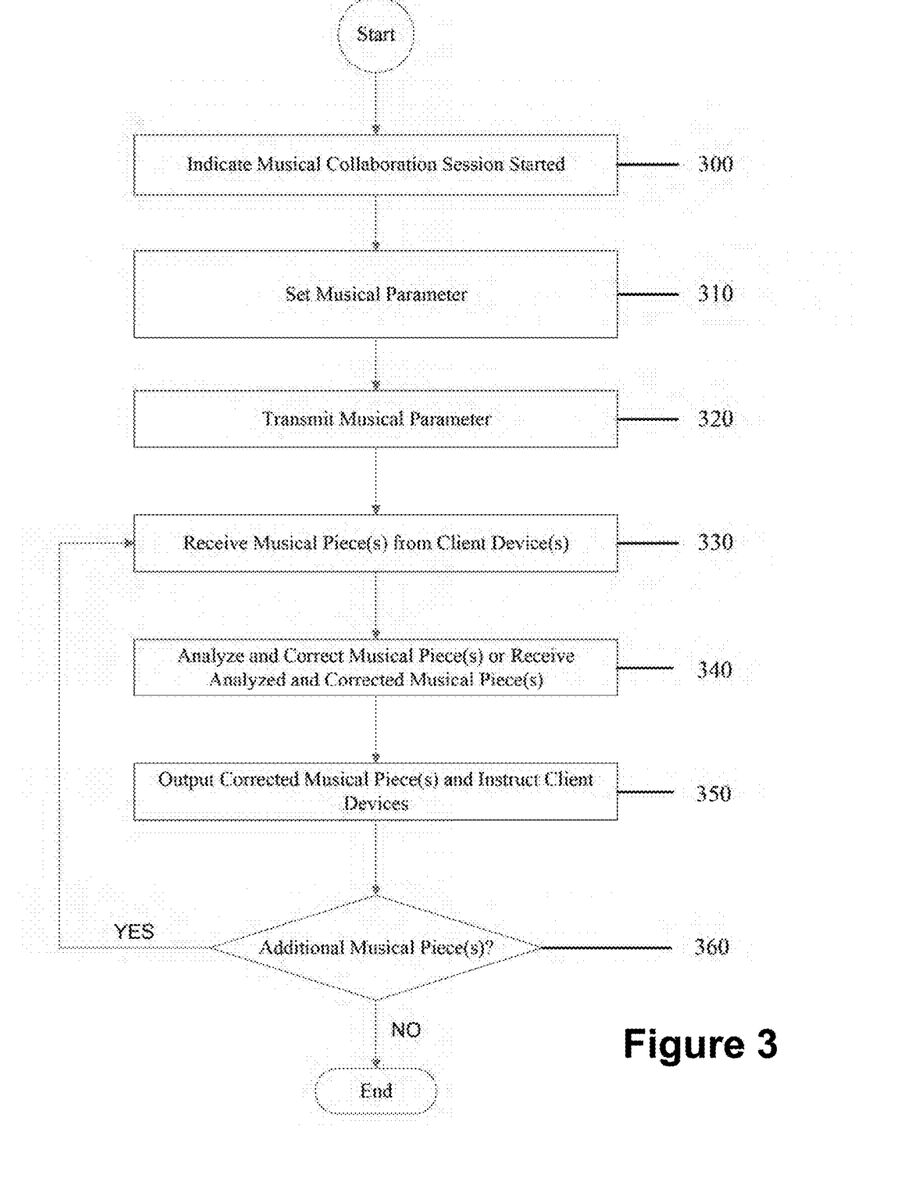
FIG. 3 is a flowchart of a process according to one embodiment.

FIG. 3 illustrates a process performed, for example, by apparatus 100. Note that the process illustrated in FIG. 3 may be performed at the client device side, or certain steps may be performed at the apparatus 100, while others performed at the client device.

At step 300, the apparatus 100 indicates to one or more client devices that a musical collaboration/session has started. In one embodiment, this may be done after first receiving information from each of the client devices 150-170 that has joined a current musical session. In one embodiment, when a participant joins a session, he/she may click a button on GUI 200 (not shown) indicating that he/she has joined. The apparatus 100 may then wait for a predetermined amount of time to wait for others to join, and then the session may be started after the predetermined time has elapsed.

In one embodiment, client devices 150-170 may join a musical collaboration at any time (i.e., not everyone has to join at the beginning of the musical collaboration). As a client device joins the collaboration, the apparatus 100 may send an indication/confirmation to all client devices and/or only the newly-joined client device that the client device has joined the musical collaboration. Note that a musical session may have any number of participants including only one.

In one embodiment, client devices 150-170 may not be able to join a musical collaboration after such collaboration has started. In other words, in such embodiment, all participants must join before the session musical begins. In such embodiment, the apparatus 100 may use the information of the number of participants to determine to how many client devices each musical piece, instruction(s), and any other information (discussed in further detail below) are to be sent.

At step 310, the apparatus 100 sets one or more musical parameters (musical information). In one embodiment, a musical parameter may be the tempo (i.e., beats per minute (BPM)). Once the musical parameter (for example, BPM) is set, the apparatus 100 sends this information to all the client devices 150-170 participating in the current session, and the musical parameter (for example, BPM) is displayed, for example, in the musical wheel 210 on each of the client devices 150-170 participating in the session. Of course, as more client devices join the musical collaboration, the apparatus 100 sends the musical parameter to the newly-joined devices so that each of the client devices is aware of the musical parameter of the current session.

In the example illustrated in FIG. 2, the BPM is set by the apparatus 100 as "95." Note that, in one embodiment, aside from the tempo, the apparatus 100) may also set additionally or alternatively, as the musical parameter, the musical genre (reggae, blues, electronic), key (for example, C) and scale (for example, major)/chord progression. Hence, the musical parameter may include a plurality of pieces of information.

Next, at step 320, the apparatus 100 outputs (transmits/multicasts) to each of the client devices 150-170 participating in the musical session the musical parameter (for example, the set BPM or any other musical parameter or combination of musical parameters). In one embodiment, note that the apparatus 100 may transmit the set musical parameter at the time that a client device joins the musical collaboration. Thus, for example, if client device A joins the session 1 minute after the session has started, the apparatus 100 will transmit the musical parameter to client device A at that time.

Next, the apparatus 100 awaits receipt of a musical piece from each of the participants. In the meantime, each client device 150 receives the set musical parameter from the apparatus 100. A participant may start composing a musical piece (i.e., a note, a chord, a kick, a clap, a guitar riff, an audio sample, a video, etc.) using the instrument panel 240 right away or wait to see what others have composed. Note that the musical piece may alternatively or additionally include audio (i.e., an audio track, vocals, etc.).

Once the participant is satisfied with the musical piece, he/she uploads it to the apparatus 100 using, for example, arrow 250. In one embodiment, a musical piece may be a piece of music including at least one measure of music (containing, for example, a minimum of 4 beats). In one embodiment, a musical piece may be a piece of music that is less than one measure (containing one, two, or three beats).

At step 330, the apparatus 100 receives musical piece(s) from client device(s). Note that the apparatus 100 may receive a musical piece from each participant or may receive musical pieces from some participants, but not others. In one embodiment, the apparatus 100 may wait until at least one musical piece is received from a participant. Once a first musical piece is received, the apparatus 100 may then wait a predetermined amount of time to see if another musical piece is received from someone else in the session.

Thus, step 340 may be started immediately after a musical piece is received, after a predetermined time, or when all musical pieces from all participants have been received. At step 340, the apparatus 100 analyzes and corrects the received musical piece. For example, in one embodiment, the apparatus 100 may use quantization to provide a more beat-accurate timing of notes or sounds (i.e., how notes/sounds fall on beat). Quantizing generally refers to snapping notes to a grid to account for a participant's mistakes of timing. For example, if the instrumental panel 240 corresponds to a keyboard and the participant plays this keyboard via panel 240, the participant may make mistakes with regard to the timing of the played notes. To compensate for the participant's mistakes, the apparatus 100 may analyze the musical piece and automatically snap the notes to a grid so that all notes will play on the musically-correct timing/rhythm.

In one embodiment, the apparatus 100 may adjust the pitch of the musical piece by either slowing down or speeding up the musical piece to musically match the musical parameter (BPM) set at step 310 and/or match any other musical piece submitted by other client device(s).

In one embodiment, the apparatus 100 may correct the pitch of notes of the musical piece by adjusting the notes to fit the key and scale. The apparatus 100 can accomplish this by moving individual notes, which were determined to be musically incorrect for the current musical collaboration, up or down. For example, assuming the instrument panel 240 corresponds to a virtual piano and the participant pressed the notes "C, Db, G" on the piano and uploaded this piece to the apparatus 100, the apparatus 100 (at step 340) would determine whether this musical piece is musically incorrect with respect to what other participants have already uploaded and/or the set musical parameter and/or any other musical piece submitted by other client device(s). If the apparatus 100 determines the uploaded musical piece of notes C, Db, G to be "in error," the apparatus 100) may correct the notes to be "C, E, G," which is more musically valid for a C Major scale (assuming the other musical pieces/musical parameter are set to the C Major scale).

In one embodiment, the apparatus 100 may perform various edits on the musical piece to be musically correction-beat. Thus, the aforementioned feature may be turned on dynamically based on the skill level of the participant, participant's preference, or the like.

Note that, in one embodiment, the apparatus 100 may not perform any edits or correcting of the musical pieces. Edits or correcting of the musical pieces may not be performed if requested, for example, by a participant at a client device 150. For example, a professional musician may not want the apparatus 100 to change his/her musical piece. In such case, the client device 150 may send a request before a session commences or during a session to the apparatus 100 to instruct the apparatus 100 not to perform any type of analysis or correcting of music (i.e., not perform step 340). Note that in a given session, one or all client devices 150 may request the apparatus 100 not to perform step 340, or such request may be preconfigured (via, for example, a user profile associated with the participant at a respective client device 150).

Note that, at step 340, the musical piece may not only be analyzed and corrected with respect to the set musical parameter (BPM), but may also be with respect to other musical pieces received by the apparatus 100 from other participants (other client devices 160, 170). Thus, in one embodiment, all received musical pieces are to be musically sound with respect to the set musical parameter (BPM) and each other.

To accomplish this, the apparatus 100 may edit and quantize each of the musical pieces. This may include taking elements from one piece and elements from another piece to generate a new musical piece. In this case, each participant would not hear his/her full music piece, but rather bits and pieces combined with bits and pieces from the other participants. In other words, the apparatus 100 may create a mashup or a remix of the uploaded musical pieces.

In one embodiment, the apparatus 100 may select one of the musical pieces as a predominant piece used as a guide for the other musical pieces to follow. Thus, the apparatus 100 may apply bits and pieces from the other musical pieces to the selected musical piece such that the selected musical piece is the predominant piece with elements of the other musical pieces inserted therein.

This selection may be performed in view of numerous factors. In one embodiment, the apparatus 100 may select the very first received musical piece as the predominant piece. In one embodiment, the apparatus 100 may select a musical piece based on a priority. This priority may be based on the performance of the participants in previous collaborations/sessions (i.e., one participant may have acquired more points than another (by participating in many sessions, for example) and thus may be considered to be a "better" musician). In such case, the "better" musician's piece would be selected as the predominant piece.

In one embodiment, the apparatus 100 may determine that each received musical piece will be played is a subsequent fashion. In other words, assuming a first participant uploads a keyboard piece and a second participant uploads a guitar piece, both of these pieces will be analyzed and corrected independently of each other to match the set musical parameter, and then will be output, one after the other. Note that apparatus 100 may also apply effects to the uploaded musical piece(s), These effects may include echo, reverb, flange, fade-in, fade-out, or the like. Additionally or alternatively, these effects may be presented via GUI 200 for one or more participants to apply to his/her musical piece.

Note that step 340 may be performed at the respective client, device. For example, once the participant at client device 150 has composed a musical piece, the client device 150 itself may perform the analyzing and correction of the musical piece, as discussed above. Once the musical piece has been processed, the client device 150 sends the processed piece to the apparatus 100, which in turn transmits the musical piece to the other participating client devices 160, 170.

Next, at step 350, the corrected musical piece(s) is/are output (transmitted/multicast) to the participating client devices so that each client device participating in the session can hear the corrected musical piece(s) in harmony and corresponding to the musical parameter initially set by the apparatus 100. Thus, at this point, all participants can hear each other's musical piece (or at least parts of each musical piece).

At step 350, the apparatus 100 instructs the client devices 150-170 how long to delay playback of the corrected musical piece(s). Thus, in one embodiment, the apparatus 100 transmits/multicasts the corrected musical piece along with instructions for all of the client devices 150-170 participating in the session to playback the corrected musical piece(s) starting on a particular measure of, for example, a musical piece that is currently playing (for example, a piece composed by another participant or a predefined drum loop set up by the apparatus 100 itself). Thus, as discussed above, depending on what measure is currently being played, the playback of the musical piece will have to be delayed until the next first measure (or fraction thereof) starts. This ensures that the musical piece is played on the beat and is musically correct.

In other words, the apparatus 100 transmits to the musical piece(s) to all participants (corrected or not, depending on user preference) along with an instruction of how long to delay playback of each musical piece. Note that the delay corresponds to a predetermined amount of time. This predetermined amount of time is linked to (associated with) one or more measures or even a fraction of a measure.

Note that the apparatus 100 transmits the musical piece along with the delay instruction via a data packet. For example, the delay instruction may be part of the header and the musical piece may be part of the payload of the packet. However, in one embodiment, the musical piece and the delay instruction may be transmitted to the client devices at different times.

Thus, as discussed above, the delay (which is transmitted to the client devices 150-170 by the apparatus) corresponds to (is associated with) at least a fraction of or a full measure. In other words, the delay may be one measure or anything under a measure (for example $\frac{1}{16}$ of a measure, $\frac{1}{8}$ of a measure, $\frac{1}{2}$ of a measure, $\frac{3}{4}$ of a measure, etc.). Furthermore, the delay may be more than a measure (i.e., 2 measures, 4 measures, etc.).

In one embodiment, the delay may be the same throughout a musical session. On the other hand, in one embodiment, the delay may vary during a musical session. For example, the first musical piece may be delayed $\frac{1}{8}$ of a measure, whereas the second musical piece may be delayed one measure. This variation may depend on numerous factors including, but not limited to, when the musical piece was transmitted/uploaded to the apparatus 100, when the musical pieces from the other client devices participating in the session were uploaded, the time it took the apparatus to perform the analyzing and correcting of the musical piece(s) (step 340), etc.

Note that the apparatus 100 may also loop the output musical piece(s) such that it plays indefinitely or loop the musical piece(s) a few times after which the musical piece(s) will stop playing.

Furthermore, it is noted that the outputting performed at step 350 may vary based on how many musical pieces have been received by the apparatus 100. For example, assuming there are two participants (at client devices 150 and 160) in a current musical collaboration; participant A at client device 150 may upload a musical piece first. In such case, the apparatus 100 (either immediately or after waiting a predetermined amount of time), performs the above-discussed steps and then outputs this musical piece at step 350. In such case, the apparatus 100 transmits the musical piece uploaded by participant A to both participant A (at client device 150) and participant B (at client device 160).

In other words, the musical piece is transmitted to all client devices of participants participating in the musical collaboration, regardless of whether all have uploaded musical pieces. In such case, the apparatus 100 may instruct both client devices 150 and 160 to delay playback of the musical composition ½ measure.

Moreover, assuming that in the example above, both client devices 150 and 160 upload musical pieces at the same time or within a given time period, the apparatus 100 will output both of the (corrected) musical pieces to each of the client devices 150 and 160. In such case, the apparatus 100 may instruct each device to delay playback of each musical piece (i.e., two musical pieces) the same amount of time (for example, 1 measure). The apparatus 100 may, however, instruct each device to delay playback of the first musical piece by ½ measure, and delay playback of the second musical piece by 1 measure. Thus, the delay may be varied from musical piece to musical piece.

Note that the apparatus may send all musical pieces to all client devices participating in the musical collaboration or may send musical pieces to client devices from which the musical pieces did not originate. For example, assuming a musical piece is composed at client device 150, the client device 150 sends musical piece A (either processed or not) to the apparatus 100. The apparatus 100 then in turn sends this musical piece A to the other client devices (for example, client devices 160 and 170), without resending musical piece A back to the originating client device 150.

In other words, in such case, not all musical pieces are sent to all client devices. Rather, a musical piece is sent only to other client devices (from which it has not originated), as the originating client device already has the musical piece. Hence, since client device 150 already has musical piece A, there is no reason for the apparatus 100 to resend it back to the client device. Rather, the apparatus 100) may simply instruct client device 150 of how long to delay the playback of musical piece A. Thus, the apparatus 100 synchronizes musical piece A such that all client devices hear it at the same time, on the same beat.

Note that the apparatus 100 can calculate how long to instruct the client devices to delay playback based on the set tempo (i.e., the BPM). Knowing the BPM allows the apparatus 100 to know the position of the composition at any given time. For example, assuming client device 170 joins the session at some later time after the collaboration has commenced (for example, 30 seconds into the composition, after the collaboration has begun). The apparatus 100 would know when the next measure (or fraction thereof) will occur as it knows the BPM of the composition and the time the composition has commenced. Thus, the apparatus 100 would be able to know how long to delay playback of a musical piece from client device 170 based on the aforementioned information.

At step 360, it is determined whether additional musical piece(s) is/are to be expected by the apparatus. If it is determined that no additional musical piece(s) is/are to be expected, the process ends. Otherwise, the process loops back to step 330, where musical piece(s) is/are received.

One way to make the aforementioned determination is to determine whether there are any client devices 150-170 still participating in the musical collaboration. This can be done by determining whether there are any client devices still connected with the apparatus 100. As an example, the apparatus 100 may attempt to communicate with the client devices and await confirmation from the client devices of the received communication. If no confirmation is sent back to the apparatus 100, it can be determined that the client devices are no longer participating in the musical collaboration and, as such, no musical piece can be expected from these devices.

Another way to make the determination at step 360 is to determine whether any of the client devices 150-170 have indicated that they have left the session. This indication may be made via a button of the GUI 200 (or via closing of the app, for example) and transmitted from a client device to the apparatus 100.

Note that at any point in the aforementioned process, the apparatus may send instructions or other type of information to each of the client devices 150 of the participants. For example, such instructions/information may include: "change from keyboard to guitar and upload a musical piece in 10 seconds." "input new keyboard notes, be careful of timing," "this session has ended, do you wish to continue?," "the BPM is about to change to 120 BPM," "the scale will be changed to minor," "your total score for this session is: 159," "David has left the session," "you have been selected to play a solo, upload your musical piece in 15 seconds," etc.

Thus, the apparatus 100 may keep the session going by encouraging participants to upload new pieces, change instruments, or the like. The apparatus 100 may also promote competition between the participants by keeping score of the quality of each uploaded musical piece, the quantity of uploaded pieces, and/or the speed with which each piece is uploaded.

The apparatus 100 may aggregate the assigned scores for each participant among different sessions to compute an overall score for each participant (i.e., not just for one session, but for all sessions the participant has participated in).

High scores also allow a participant to unlock additional material. For example, the apparatus 100 may unlock a new instrument for the instrument panel 240 for a participant that has exceeded a predetermined score. Such instrument may be a particular type of guitar. For example, the apparatus 100 may unlock Kun Cobain's Fender Jag-Stang, James Hetfield's "EET FUK" ESP Explorer, Rick Nielsen's Five-Neck Hamer, Willie Nelson's "Trigger," Prince's "Cloud," Matt Bellamy's Black Kaoss Manson, Gene Simmons' "Axe" Bass, Neil Young's "Old Black" Gibson Les Paul, Paul McCartney's HOlner Bass, Eddie Van Halen's "Frankenstrat," Keith Richards' "Micawber" Fender Telecaster, Jimi Hendrix's Monterey Fender Stratocaster, or Jimmy Page's Gibson Les Paul Standard, just to name a few.

In one embodiment, unlocking these guitars gives a participant more musical freedom in composing a musical piece that is more unique than other participants may be able to compose using their respective instruments. A participant using Jimmy Page's Gibson Les Paul Standard may thus produce a more memorable and unique piece and thus earn more points (which may be given for complexity of the musical piece and for how quickly the musical piece was created) to get a competitive edge over the other participants.

In one embodiment, the apparatus 100 may assign extra points to a participant based on whether the other participants in the musical session gave the participant (or musical piece uploaded by the participant) a "thumbs-up," "applause," or the like. Thus, a "thumbs-up" button or an "applause" button may be displayed on the GUI 200 of each participant, and a participant can press this button at any time after hearing a music piece from another participant.

In one embodiment, the apparatus 100 may instruct the client devices when to start playing/uploading. This may be done via a message on GUI 200, and it may be done, for example, at any time before step 330, Thus, the apparatus 100 may stagger the start time of when participants start playing so that, for example, a participant who will play the drums (i.e., the drummer) may begin playing one measure earlier than the other participants in the musical collaboration. This can minimize perceived artificially-introduced latency for other participants because to them, the drummer will sound normal. This staggered start may be determined dynamically based on what type of instrument is used (for example, drums may always be staggered differently than violins).

In one embodiment, however, the aforementioned staggering may be performed by controlling the delay of playback of musical pieces that are generated using certain instruments in a different fashion than other instruments. For example, assuming a first participant at client device 150 uploads a drum musical piece and a second participant at client device 160 uploads a piano musical piece. In such case, the apparatus may instruct the clients devices 150 and 160 to delay playback of the drum musical piece by ½ measure and delay playback of the piano musical piece by 2 measures. This would achieve the effect of having a drum intro (i.e., drum musical piece will play by itself for 1½ measures, and then the piano musical piece will come in at 2 measures).

Such concept may be preconfigured in the apparatus 100. For example, the apparatus 100 may store therein certain rules for providing delays (i.e., drums always receive a shorter delay; pianos always receive a longer delay than drums, but a short delay than violins, etc.).

In one embodiment, as noted throughout the present disclosure, live musical instruments may be connected to the client devices 150-170. Thus, a participant may use a live instrument (or a combination of live instruments and virtual instruments controlled via instrument panel 240) to compose the musical piece. This may include, for example, any type of live audio input such as vocal, bass, guitar, microphone recording, etc. Note that a microphone input and a webcam may be used to input both voice/audio and video.

Thus, in one embodiment, a participant may be able to upload through a sound card interface which contains an audio cable input from a guitar (or some other live instrument) or a microphone. This achieves the advantage of allowing a participant to plug in a real guitar or record himself/herself playing the violin, sing into a microphone, etc., and use the results in the musical collaboration.

Furthermore, in one embodiment, Skype, Facetime, or any other audio/video service may be used to input audio/video from the client device 150 to the apparatus 100, as discussed above. Thus, a participant may provide vocals as the musical piece. In one embodiment, if a connection is lost while using any of the aforementioned services, the apparatus 100 may instruct the respective client device 150 to gradually decrease the volume of the musical piece (i.e., if a participant is singing live and the connection gets cuts off, the vocals will be gradually faded out in an effort to maintain musical integrity).

Note that when using services such as Skype of Facetime, there is a continuous stream of audio (as opposed to when a musical piece is created using, for example, the instrument panel 240, and then uploaded). In such case, the apparatus 100 will determine the necessary amount of delay to ensure that the continuous stream signal is appropriately synchronized with non-streamed musical performances (such as notes performed via the instrument panel 240, MIDI notes, or the like). The same concept applies to an audio track that may be continuously streamed similar to a Skype or Facetime call.

Note that the video accompanying the Skype or Facetime call may also be synchronized (i.e., delayed) to coincide with the audio of the same call. For example, assume a participant is recording himself (for example, via a webcam) playing the guitar. In such case, both the video and the audio may be uploaded, via client device 150, to the apparatus 100. In turn, the apparatus would determine the appropriate delay of the audio and the video so that the video will correctly correspond to the audio musical piece. With such embodiment, other participants may hear the audio musical piece as well as see the guitarist playing the musical piece via video. This would give the same effect as if everyone were in the same room at the same time experiencing both audio and visual of a guitarist playing the guitar.

In one embodiment, the client devices 150-170 may be used with MIDI-type devices. In one embodiment, the musical pieces created by the participants may be in a MIDI format. In one embodiment, the musical pieces created may be in any type of audio format, or a combination of formats.

In one embodiment, artificial intelligence "bots" may be used. For example, in the event that human participants are unavailable to participate in a musical collaboration, the apparatus 100 may introduce artificial intelligence bots (automated computer players) that mimic the behavior of trained musicians. For example, the apparatus 100 may add a "Drum" hot to the musical collaboration to play drums (i.e., generate a drum loop) using a predetermined or dynamically created set of drum patterns that would match the set musical parameter (i.e., the current tempo, key, genre style, etc.). This drum loop may serve as the foundation of the musical composition or song upon which the participants will build by adding drums, chords, claps, kicks, etc., or even voice (for example, singing).

A drum loop may be generated, for example, using a drum machine. Note that the apparatus 100 can randomly generate the musical loop or randomly select such a loop from a database of loops that have been previously generated. In one embodiment, the drum loop may be any type of musical loop (for example, a chord loop, etc.). Note that the musical loop may be transmitted to the client devices 150-170 at the same time as the musical parameter, or may be transmitted one after the other.

In the event of connection loss between a client device 150 and the apparatus 100, where a participant in a musical collaboration becomes unavailable, the apparatus 100 may automatically substitute artificial intelligence bots in place of the disconnected participant to keep the musical collaboration going. For example, if client devices A, B and C are playing music together, and client A is disconnected, the following may take place: Client A will see via the GUI 200 that Client B and Client C have been replaced by bots. Similarly, Client B and Client C will see Client A replaced by the bot, and the music collaboration may continue until termination.

In one embodiment, the apparatus 100 stores a plurality of musical song structure templates such as, but not limited to:

Intro, Verse, Chorus, Verse Chorus, Bridge, Chorus, Outro, etc. These templates may be based on popular music of today. Following this structure provides the advantage of making the musical collaboration more dynamic. Such templates may give a hint to participants about what type of composition to create live. Note that, in one embodiment, this may be part of the information that may be sent to all client devices 150-170 along with visible or audible instructions about Verse, Chorus, and other structure blocks. Additionally or alternatively, the apparatus may send the information/templates at step 320 along with the musical parameter.

By having this information, the participant will know what type of musical piece to compose. For example, this type of information lets the participant know when the next change is coming up (when, for example, the chorus is coming up). This will help participant compose a musical piece that is in line with how a chorus is expected to sound. This will make the overall musical composition more dynamic and sound more like a popular song that may be played on the radio (i.e., a song that includes intro, verses, chorus, etc.).

Moreover, the apparatus 100 may use the song structure template to automatically add fills, drum rolls, effects, and other elements that often coincide with a change from one song structure part to the next, such as a change from Verse to Chorus.

All client devices 150-170 may select to hear or not hear the automatically generated fills created by the apparatus 100. This may be done via the GUI 200 or via a preconfigured user profile. The apparatus 100 may automatically add certain elements to the musical pieces to better indicate to the players what "block" (i.e., a visual indicator of one or more sections of the composition) of the structure is currently playing. For example, the Chorus may automatically be played louder, or the Chorus may have additional percussion elements such as an automatic hi-hat pattern being added to increase the energy of the Chorus in comparison with the Verse.

To reiterate, although the above-discussions indicate that the apparatus 100 performs the process set forth in FIG. 3, note that a client device 150 may perform the process discussed above as being performed by the apparatus 100. In other words, a client device 150 may set the musical parameter(s), receive musical piece(s) from other client devices, perform analysis on the musical piece(s), transmit the analyzed musical piece(s) along with delay instruction (s), etc.

Also, any or all of the client devices 150-170 may perform part of the features discussed above with reference to FIG. 3. For example, as noted above, the client device may perform the processing of the musical piece and then transmit the processed musical piece to the apparatus 100 so the apparatus 100 may multicast the piece to the other devices participating in the musical collaboration/session. Having such process performed on the client device side helps save processing power and time on the apparatus 100 side. Thus, the musical pieces may be multicast in a quicker fashion which allows participants to hear their musical pieces almost immediately after upload.

Further, although the above-discussions generally relate to musical pieces, the specification is not limited to this. For example, any other audio, video, or sound/visual effects may be uploaded by the client devices 150-170 and analyzed and corrected by the apparatus 100 or client device(s) (at step 340). For example, a participant may wish to upload a visual effect or audio/video of, for example, fireworks to accompany his/her musical piece. The apparatus 100 or client device(s) would then analyze and correct the musical piece, and the apparatus 100 would synchronize the visual effect or video to the corrected musical piece so that, for example, the explosion of fireworks occurs on a particular part of the musical piece.

To summarize, the apparatus 100 eliminates latency by not instructing playback of a musical piece as soon as it is uploaded. Instead, the apparatus analyzes the musical piece, performs any necessary corrections, and then transmits/multicasts the corrected piece to all participants in the musical session (or all participants except the participant that uploaded the particular musical piece). The apparatus 100 transmits/multicasts the corrected musical piece along with instructions for the client devices 150-170 participating in the session to playback the piece starting on a particular measure (or fraction thereof) of a currently playing musical piece (i.e., previously uploaded) and/or a musical loop (for example, a drum loop generated by the apparatus 100). This ensures that the musical piece is played in a musically correct/valid fashion. Playing this anywhere else may sound "off" and thus musically incorrect/invalid.

Note that, based on when a musical piece was uploaded, different client devices 150-170 may receive different delay instructions during a given session (i.e., a first device may receive instructions to delay playback by ½ of a measure, whereas a second device may receive instructions to delay playback by ¾ of a measure). During the same session, the delay instruction may vary from musical piece to musical piece. For example, the first musical piece uploaded by client device 150 may be delayed 2 measures, whereas a second musical piece uploaded by the same client device 150 may be delayed 4 measures.

The present disclosure addresses the latency issue regardless of distance of the client devices 150-170 from the apparatus 100. In one embodiment this is because the delay that takes place with analyzing the musical piece, performing any necessary corrections, and transmitting the corrected piece is long enough to account for latency. Thus, even if a participant uploads "late" to catch the beginning of the upcoming measure, the apparatus 100 will just instruct a delay to the "next" measure (or fraction thereof) after that.

Accordingly, the present disclosure addresses the deficiencies of conventional techniques by introducing a particular predetermined delay. This delay indicates to the client device when it should playback the musical piece. Since the delay is calculated ahead of time and is associated with a measure or a fraction thereof, it solves the latency issue and allows a plurality of client devices to musically collaborate (i.e., have a "jam session") regardless of the physical location of each device throughout the world.

Figure 4:
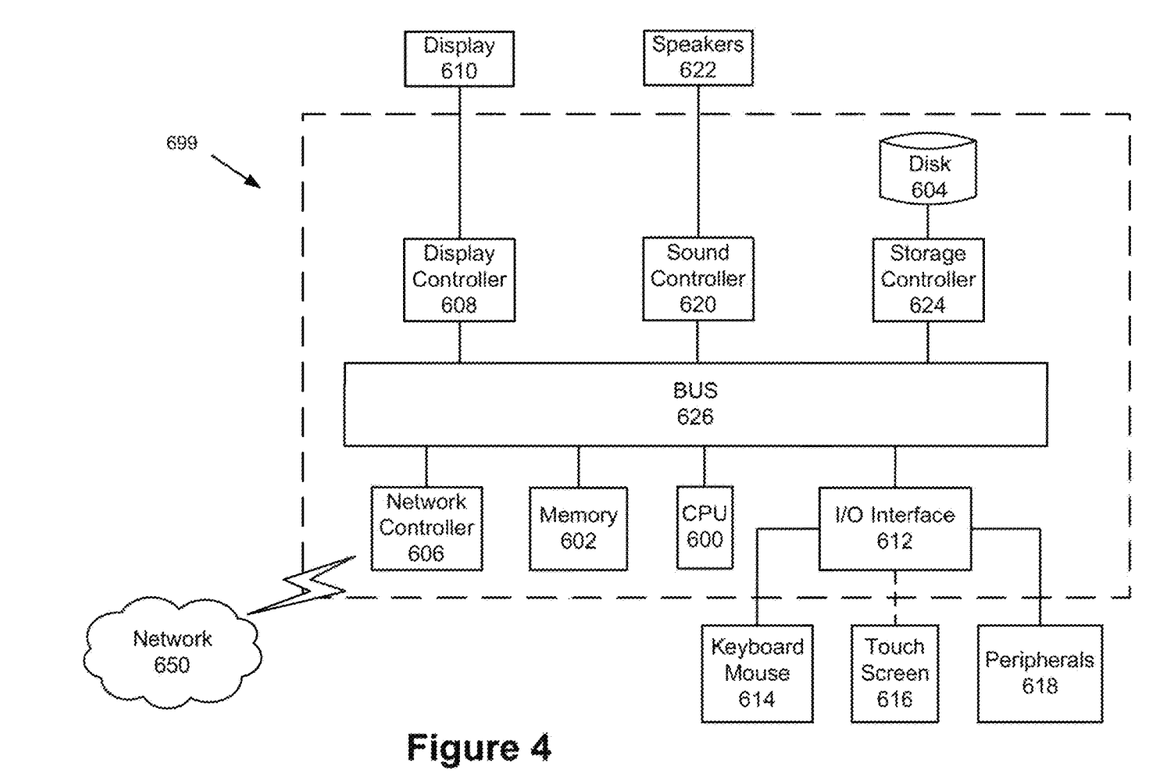
FIG. 4 illustrates a computer system upon which embodiments of the present disclosure may be implemented.

Each of the functions of the above described embodiments may be implemented by circuitry, which includes one or more processing circuits. A processing circuit includes a particularly programmed processor, for example, processor (CPU) 600, as shown in FIG. 4. A processing circuit also includes devices such as an application specific integrated circuit (ASIC) and conventional circuit components arranged to perform the recited functions.

In FIG. 4, the device 699 includes a CPU 600 which performs the processes described above. The device 699 may be a general-purpose computer or a particular, special-purpose machine. In one embodiment, the device 699 becomes a particular, special-purpose machine when the processor 600 is programmed to participate in musical collaboration(s), compensate for latency in musical collaboration(s), and/or perform one or more steps of the process of FIG. 3.

The process data and instructions may be stored in memory 602. These processes and instructions may also be stored on a storage medium disk 604 such as a hard drive (HDD) or portable storage medium or may be stored remotely. The instructions may be stored on CDs, DVDs, in FLASH memory, RAM, ROM, PROM, EPROM, EEPROM, hard disk or any other device with which the system communicates, such as a server or computer. In other words, the instructions may be stored on any non-transitory computer-readable storage medium to be executed on a computer.

Further, the discussed embodiments may be provided as a utility application, background daemon, or component of an operating system, or combination thereof, executing in conjunction with CPU 600 and an operating system such as, but not limited to, Microsoft Windows, UNIX, Solaris, LINUX. Android, Apple MAC-OS, Apple iOS and other systems known to those skilled in the art.

CPU 600 may be any type of processor that would be recognized by one of ordinary skill in the art. For example, CPU 600 may be a Xenon or Core processor from Intel of America or an Opteron processor from AMD of America. CPU 600 may be a processor having ARM architecture or any other type of architecture. CPU 600 may be any processor found in a mobile device (for example, cellular/smart phones, tablets, personal digital assistants (PDAs), or the like). CPU 600 may also be any processor found in musical instruments (for example, a musical keyboard or the like).

Additionally or alternatively, the CPU 600 may be implemented on an FPGA, ASIC, PLD or using discrete logic circuits, as one of ordinary skill in the art would recognize. Further, CPU 600 may be implemented as multiple processors cooperatively working in parallel to perform the instructions of the processes described herein.

The computer 699 in FIG. 4 also includes a network controller 606, such as, but not limited to, a network interface card, for interfacing with network 650. As can be appreciated, the network 650 can be a public network, such as, but not limited to, the Internet, or a private network such as an LAN or WAN network, or any combination thereof and can also include PSTN or ISDN sub-networks. The network 650 can also be wired, such as an Ethernet network, or can be wireless such as a cellular network including EDGE, 3G and 4G wireless cellular systems. The wireless network can also be WiFi, Bluetooth, or any other wireless form of communication that is known.

The computer 699 further includes a display controller 608, such as, but not limited to, a graphics adaptor for interfacing with display 610, such as, but not limited to, an LCD monitor. A general purpose I/O interface 612 interfaces with a keyboard and/or mouse 614 as well as a touch screen panel 616 on or separate from display 610. General purpose I/O interface also connects to a variety of peripherals 618 including printers and scanners. The peripheral elements discussed herein may be embodied by the peripherals 618 in the exemplary embodiments.

A sound controller 620 may also be provided in the computer 699 to interface with speakers/microphone 622 thereby providing sounds and/or music. The speakers/microphone 622 can also be used to accept dictated words as commands.

The general purpose storage controller 624 connects the storage medium disk 604 with communication bus 626, which may be an ISA, EISA, VESA, PCI, or similar. A description of the general features and functionality of the display 610, keyboard and/or mouse 614, as well as the display controller 608, storage controller 624, network controller 606, sound controller 620, and general purpose I/O interface 612 is omitted herein for brevity as these features are known.

Obviously, numerous modifications and variations of the present disclosure are possible in light of the above teachings. It is therefore to be understood that within the scope of the appended claims, the invention may be practiced otherwise than as specifically described herein.

For example, advantageous results may be achieved if the steps of the disclosed techniques were performed in a different sequence, if components in the disclosed systems were combined in a different manner, or if the components were replaced or supplemented by other components.

The functions, processes, and algorithms described herein may be performed in hardware or software executed by hardware, including computer processors and/or programmable processing circuits configured to execute program code and/or computer instructions to execute the functions, processes, and algorithms described herein.

The functions and features described herein may also be executed by various distributed components of a system. For example, one or more processors may execute these system functions, wherein the processors are distributed across multiple components communicating in a network. The distributed components may include one or more client and/or server machines, in addition to various human interface and/or communication devices (e.g., display monitors, cellular/smart phones, tablets, PDAs). The network may be a private network, such as a LAN or WAN, or may be a public network, such as the Internet. Input to the system may be received via direct user input and/or received remotely either in real-time or as a batch process.

Additionally, some implementations may be performed on modules or hardware not identical to those described. Accordingly, other implementations are within the scope that may be claimed.

It should be noted that, as used in the specification and the appended claims, the singular forms "a," "an," and "the" include plural referents unless the context clearly dictates otherwise. Further, the embodiments discussed herein may be combined together in any fashion.

The invention claimed is:

1. An apparatus that compensates for latency in a musical collaboration, the apparatus comprising:
   processing circuitry configured to
      set a tempo for a first client device to follow,
      receive, after setting the tempo, a musical piece associated with the set tempo from the first client device,
      process the musical piece received from the first client device to correspond to the set tempo, in response to a determination that the musical piece received from the first client device does not correspond to the set tempo,
      transmit, after processing the musical piece, the processed musical piece to a second client device, and
      instruct the second client device, via an instruction transmitted along with the processed musical piece, to delay playback of the processed musical piece a predetermined amount of time to compensate for latency in the musical collaboration, the predetermined amount of time being associated with a measure or a fraction of a measure and being calculated based on the set tempo.

2. The apparatus according to claim 1, wherein the processing circuitry is further configured to set the tempo as well as a key and a scale for the first client device to follow.

3. The apparatus according to claim 1, wherein the processing circuitry is further configured to
  indicate to the first client device, the second client device, and a third client device that the musical collaboration has started,
  transmit, after processing the musical piece, the processed musical piece to the third client device, and
  instruct the third client device, via an instruction transmitted along with the processed musical piece, to delay playback of the processed musical piece a predetermined amount of time to compensate for latency in the musical collaboration, the predetermined amount of time being associated with a measure or a fraction of a measure.

4. The apparatus according to claim 1, wherein the predetermined amount of time is associated with 1/16 of a measure, 1/8 of a measure, 1/2 of a measure, 3/4 of a measure, 1 measure, 2 measures, or 4 measures.

5. The apparatus according to claim 1, wherein the apparatus and the first client device are same, or the apparatus and the first client device are different.

6. The apparatus according to claim 1, wherein the processing circuitry processes the musical piece received from the first client device by slowing down or speeding up the musical piece to musically match the set tempo, in response to the determination that the musical piece received from the first client device does not correspond to the set tempo.

7. The apparatus according to claim 1, wherein the processing circuitry is further configured to determine whether the musical piece received from the first client device is musically correct with respect to another musical piece received from another client device.

8. A method that compensates for latency in a musical collaboration, the method comprising:
  setting a tempo for a first client device to follow;
  receiving, after the setting of the tempo, a musical piece associated with the set tempo from the first client device;
  processing the musical piece received from the first client device to correspond to the set tempo, in response to a determination that the musical piece received from the first client device does not correspond to the set tempo;
  transmitting, after the processing of the musical piece, the processed musical piece to second client device; and
  instructing the second client device, via an instruction transmitted along with the processed musical piece, to delay playback of the processed musical piece a predetermined amount of time to compensate for latency in the musical collaboration, the predetermined amount of time being associated with a measure or a fraction of a measure and being calculated based on the set tempo.

9. The method according to claim 1, further comprising: setting the tempo as well as a key and a scale for the first client device to follow.

10. The method according to claim 8, further comprising:
  indicating to the first client device, the second client device, and a third client device that the musical collaboration has started;
  transmitting, after the processing of the musical piece, the processed musical piece to the third client device; and
  instructing the third client device, via an instruction transmitted along with the processed musical piece, to delay playback of the processed musical piece a predetermined amount of time to compensate for latency in the musical collaboration, the predetermined amount of time being associated with a measure or a fraction of a measure.

11. The method according to claim 8, wherein the predetermined amount of time is associated with 1/16 of a measure, 1/8 of a measure, 1/2 of a measure, 3/4 of a measure, 1 measure, 2 measures, or 4 measures.

12. A method comprising:
  setting a musical parameter for a device;
  receiving, after the setting of the musical parameter, a musical piece associated with the musical parameter from the device;
  processing the musical piece received from the device to correspond to the musical parameter, in response to a determination that the musical piece received from the device does not correspond to the set musical parameter;
  transmitting, after the processing of the musical piece, the processed musical piece to another device; and
  instructing the another device, via an instruction transmitted along with the processed musical piece, to delay playback of the processed musical piece a predetermined amount of time, the predetermined amount of time being associated with a measure or a fraction of a measure and being calculated based on the set musical parameter.

13. A non-transitory computer-readable storage medium including computer executable instructions, wherein the instructions, when executed by a computer, cause the computer to perform a method that compensates for latency in a musical collaboration, the method comprising:
  setting a tempo for a first client device to follow;
  receiving, after the setting of the tempo, a musical piece associated with the set tempo from the first client device;
  processing the musical piece received from the first client device to correspond to the set tempo, in response to a determination that the musical piece received from the first client device does not correspond to the set tempo;
  transmitting, after the processing of the musical piece, the processed musical piece to a second client device; and
  instructing the second client device, via an instruction transmitted along with the processed musical piece, to delay playback of the processed musical piece a predetermined amount of time to compensate for latency in the musical collaboration, the predetermined amount of time being associated with a measure or a fraction of a measure and being calculated based on the set tempo.

14. The non-transitory computer-readable storage medium according to claim 13, further comprising: setting the tempo as well as a key and a scale for the first client device to follow.

15. The non-transitory computer-readable storage medium according to claim 13, further comprising:
  indicating to the first client device, the second client device, and a third client device that the musical collaboration has started;
  transmitting, after the processing of the musical piece, the processed musical piece to the third client device; and
  instructing the third client device, via an instruction transmitted along with the processed musical piece, to delay playback of the processed musical piece a predetermined amount of time to compensate for latency in the musical collaboration, the predetermined amount of time being associated with a measure or a fraction of a measure.

16. The non-transitory computer-readable storage medium according to claim 13, wherein the predetermined amount of time is associated with 1/16 of a measure, 1/8 of a measure, 1/2 of a measure, 3/4 of a measure, 1 measure, 2 measures, or 4 measures.

* * * * *